(12) United States Patent
Nitta et al.

(10) Patent No.: US 11,209,616 B1
(45) Date of Patent: Dec. 28, 2021

(54) CAMERA OPTICAL LENS

(71) Applicant: AAC Optics Solutions Pte. Ltd., Singapore (SG)

(72) Inventors: Koji Nitta, Osaka (JP); Lei Zhang, Shenzhen (CN); Yuanshan Cui, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 1 day.

(21) Appl. No.: 16/996,941

(22) Filed: Aug. 19, 2020

(30) Foreign Application Priority Data

Jun. 16, 2020 (CN) .......................... 202010545135.1

(51) Int. Cl.
| | | |
|---|---|---|
| G02B 9/62 | (2006.01) | |
| G02B 13/00 | (2006.01) | |
| G02B 3/04 | (2006.01) | |
| H04N 5/374 | (2011.01) | |
| H04N 5/372 | (2011.01) | |

(52) U.S. Cl.
CPC .................. *G02B 9/62* (2013.01); *G02B 3/04* (2013.01); *G02B 13/0045* (2013.01); *H04N 5/372* (2013.01); *H04N 5/374* (2013.01)

(58) Field of Classification Search
CPC ... G02B 9/62; G02B 9/60; G02B 9/64; G02B 13/0045; G02B 13/005; G02B 13/0055
USPC .......................................... 359/713, 754–757
See application file for complete search history.

(56) References Cited

U.S. PATENT DOCUMENTS

| | | | | |
|---|---|---|---|---|
| 2017/0199350 | A1* | 7/2017 | Teraoka | G02B 5/005 |
| 2017/0357080 | A1* | 12/2017 | Dai | G02B 13/18 |
| 2019/0227265 | A1* | 7/2019 | Shi | G02B 27/0037 |
| 2019/0250375 | A1* | 8/2019 | Oinuma | G02B 9/62 |
| 2021/0141192 | A1* | 5/2021 | Jhang | G02B 13/18 |

FOREIGN PATENT DOCUMENTS

| | | |
|---|---|---|
| CN | 108427179 A | 8/2018 |
| CN | 109307922 A | 2/2019 |
| CN | 109459841 A | 3/2019 |
| CN | 111090166 A | 5/2020 |
| CN | 111399196 A | 7/2020 |
| EP | 3244247 A1 | 11/2017 |
| JP | 2019120864 A | 7/2019 |

\* cited by examiner

*Primary Examiner* — Jordan M Schwartz
(74) *Attorney, Agent, or Firm* — W&G Law Group

(57) ABSTRACT

The present invention provides a camera optical lens including, sequentially from an object side to an image side: a first lens having a positive refractive power; a second lens having a negative refractive power; a third lens having a negative refractive power; a fourth lens having a positive refractive power; a fifth lens having a positive refractive power; and a sixth lens having a negative refractive power. The camera optical lens satisfies following conditions: $1.00 \leq d4/d6 \leq 2.50$; $-5.00 \leq R6/R11 \leq -3.20$; $22.00 \leq R7/d7 \leq 33.00$; and $-2.00 \leq f3/f4 \leq -1.20$. The camera optical lens can achieve high optical performance while satisfying design requirements for ultra-thin, wide-angle lenses having large apertures.

17 Claims, 7 Drawing Sheets

CAMERA OPTICAL LENS

TECHNICAL FIELD

The present invention relates to the field of optical lens, and more particularly, to a camera optical lens suitable for handheld terminal devices, such as smart phones or digital cameras, and camera devices, such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality becoming increasingly higher, a five-piece or six-piece or seven-piece lens structure gradually emerges in lens designs. Although the common six-piece lens has good optical performance, its refractive power, lens spacing and lens shape settings still have some irrationality, such that the lens structure cannot achieve high optical performance while satisfying design requirements for ultra-thin, wide-angle lenses having large apertures.

SUMMARY

In view of the problems, the present invention aims to provide a camera optical lens, which can achieve high optical performance while satisfying design requirements for ultra-thin, wide-angle lenses having large apertures.

In an embodiment, the present invention provides a camera optical lens. The camera optical lens includes, sequentially from an object side to an image side: a first lens having a positive refractive power; a second lens having a negative refractive power; a third lens having a negative refractive power; a fourth lens having a positive refractive power; a fifth lens having a positive refractive power; and a sixth lens having a negative refractive power. The camera optical lens satisfies following conditions: $1.00 \leq d4/d6 \leq 2.50$; $-5.00 \leq R6/R11 \leq -3.20$; $22.00 \leq R7/d7 \leq 33.00$; and $-2.00 \leq f3/f4 \leq -1.20$, where f3 denotes a focal length of the third lens; f4 denotes a focal length of the fourth lens; R6 denotes a curvature radius of an image side surface of the third lens; R7 denotes a curvature radius of an object side surface of the fourth lens; R11 denotes a curvature radius of an object side surface of the sixth lens; d4 denotes an on-axis distance from an image side surface of the second lens to an object side surface of the third lens; d6 denotes on-axis distance from the image side surface of the third lens to the object side surface of the fourth lens; and d7 denotes an on-axis thickness of the fourth lens.

As an improvement, the first lens comprises an object side surface being convex in a paraxial region and an image side surface being concave in the paraxial region. The camera optical lens satisfies following conditions: $0.41 \leq f1/f \leq 1.25$; $-3.29 \leq (R1+R2)/(R1-R2) \leq -1.05$; and $0.06 \leq d1/TTL \leq 0.20$, where f denotes a focal length of the camera optical lens; f1 denotes a focal length of the first lens; R1 denotes a curvature radius of the object side surface of the first lens; R2 denotes a curvature radius of the image side surface of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $0.65 \leq f1/f \leq 1.00$; $-2.05 \leq (R1+R2)/(R1-R2) \leq -1.32$; and $0.10 \leq d1/TTL \leq 0.16$.

As an improvement, the second lens comprises an object side surface being convex in a paraxial region, and the image side surface of the second lens is concave in the paraxial region. The camera optical lens satisfies following conditions: $-4.16 \leq f2/f \leq -1.34$; $1.20 \leq (R3+R4)/(R3-R4) \leq 5.65$; and $0.02 \leq d3/TTL \leq 0.06$, where f denotes a focal length of the camera optical lens; f2 denotes a focal length of the second lens; R3 denotes a curvature radius of the object side surface of the second lens; R4 denotes a curvature radius of the image side surface of the second lens; d3 denotes an on-axis thickness of the second lens; and TTL denotes a total optical length from an object side surface of the first lens to an image plane of the camera optical lens along an optic axis.

As an improvement, the camera optical lens further satisfies following conditions: $-2.60 \leq f2/f \leq -1.68$; $1.93 \leq (R3+R4)/(R3-R4) \leq 4.52$; and $0.03 \leq d3/TTL \leq 0.06$.

As an improvement, the object side surface of the third lens is convex in a paraxial region, and the image side surface of the third lens is concave in the paraxial region. The camera optical lens satisfies following conditions: $-281.40 \leq f3/f \leq -12.17$; $1.69 \leq (R5+R6)/(R5-R6) \leq 52.32$; and $0.03 \leq d5/TTL \leq 0.09$, where f denotes a focal length of the camera optical lens; R5 denotes a curvature radius of the object side surface of the third lens; R6 denotes a curvature radius of the image side surface of the third lens; d5 denotes an on-axis thickness of the third lens; and TTL denotes a total optical length from an object side surface of the first lens to an image plane of the camera optical lens along an optic axis.

As an improvement, the camera optical lens further satisfies following conditions: $-175.87 \leq f3/f \leq -15.22$; $2.71 \leq (R5+R6)/(R5-R6) \leq 41.86$; and $0.05 \leq d5/TTL \leq 0.08$.

As an improvement, the object side surface of the fourth lens is convex in a paraxial region, and the fourth lens further comprises an image side surface being concave in the paraxial region. The camera optical lens satisfies following conditions: $4.58 \leq f4/f \leq 131.90$; $-147.87 \leq (R7+R8)/(R7-R8) \leq -4.00$; and $0.03 \leq d7/TTL \leq 0.09$, where f denotes a focal length of the camera optical lens; R8 denotes a curvature radius of the image side surface of the fourth lens; and TTL denotes a total optical length from an object side surface of the first lens to an image plane of the camera optical lens along an optic axis.

As an improvement, the camera optical lens further satisfies following conditions: $7.32 \leq f4/f \leq 105.52$; $-92.42 \leq (R7+R8)/(R7-R8) \leq -5.00$; and $0.04 \leq d7/TTL \leq 0.07$.

As an improvement, the fifth lens comprises an object side surface being convex in a paraxial region and an image side surface being convex in the paraxial region. The camera optical lens satisfies following conditions: $0.45 \leq f5/f \leq 1.44$; $0.33 \leq (R9+R10)/(R9-R10) \leq 1.19$; and $0.08 \leq d9/TTL \leq 0.32$, where f denotes a focal length of the camera optical lens; f5 denotes a focal length of the fifth lens; R9 denotes a curvature radius of the object side surface of the fifth lens; R10 denotes a curvature radius of the image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens further satisfies following conditions: $0.73 \leq f5/f \leq 1.15$; $0.53 \leq (R9+R10)/(R9-R10) \leq 0.95$; and $0.09 \leq d9/TTL \leq 0.25$.

As an improvement, the object side surface of the sixth lens is concave in a paraxial region, and the sixth lens further comprises an image side surface being concave in the paraxial region. The camera optical lens satisfies following conditions: $-1.24 \leq f6/f \leq -0.39$; $0.12 \leq (R11+R12)/(R11-R12) \leq 0.46$; and $0.05 \leq d11/TTL \leq 0.14$, where f denotes a focal length of the camera optical lens; f6 denotes a focal length of the sixth lens; R12 denotes a curvature radius of the image side surface of the sixth lens; d11 denotes an on-axis thickness of the sixth lens; and TTL denotes a total optical length from an object side surface of the first lens to an image plane of the camera optical lens along an optic axis.

As an improvement, the camera optical lens further satisfies following conditions: $-0.78 \leq f6/f \leq -0.49$; $0.18 \leq (R11+R12)/(R11-R12) \leq 0.37$; and $0.07 \leq d11/TTL \leq 0.11$.

As an improvement, an F number FNO of the camera optical lens is smaller than or equal to 1.96.

As an improvement, the F number FNO of the camera optical lens is smaller than or equal to 1.92.

As an improvement, a total optical length TTL from an object side surface of the first lens to an image plane of the camera optical lens along an optic axis is smaller than or equal to 7.15 mm.

As an improvement, the total optical length TTL is smaller than or equal to 6.82 mm.

The present invention has advantageous effects in that the camera optical lens according to the present invention has excellent optical characteristics and is ultra-thin, wide-angle and has a large aperture, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figure and the embodiments. It should be understood the specific embodiments described hereby is only to explain the disclosure, not intended to limit the disclosure.

Embodiment 1

Figure 1:
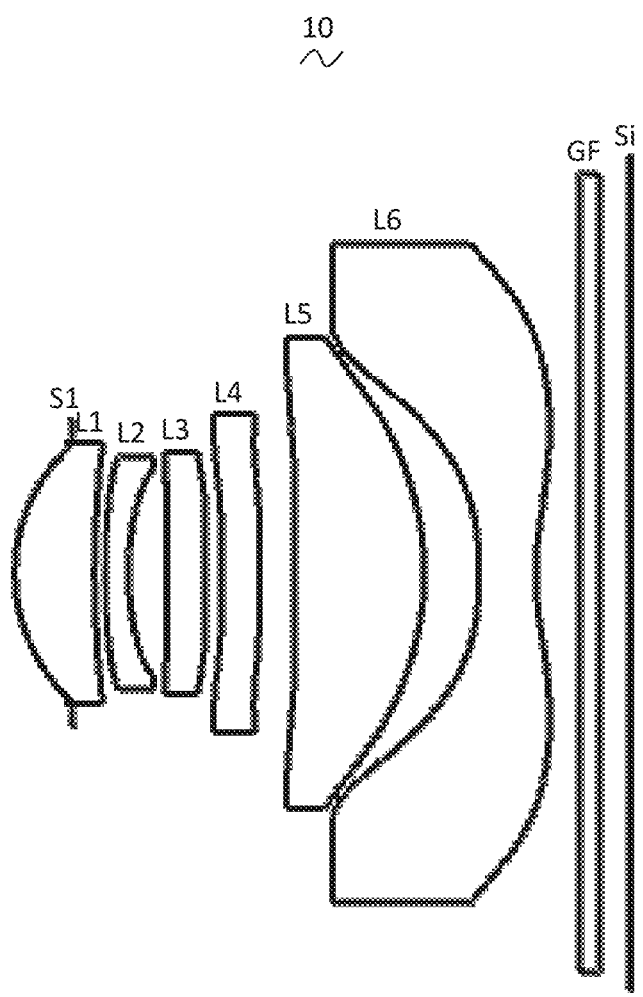
FIG. 1 is a schematic diagram of a structure of a camera optical lens in accordance with Embodiment 1 of the present invention.

Referring to FIG. 1, the present invention provides a camera optical lens 10. FIG. 1 shows the camera optical lens 10 according to Embodiment 1 of the present invention. The camera optical lens 10 includes six lenses. The camera optical lens 10 includes, sequentially from an object side to an image side, an aperture S1, a first lens L1, a second lens L2, a third lens L3, a fourth lens L4, a fifth lens L5, and a sixth lens L6. An optical element such as a glass filter can be arranged between the seventh lens L7 and an image plane Si.

The first lens L1 has a positive refractive power, the second lens L2 has a negative refractive power, the third lens L3 has a negative refractive power, the fourth lens L4 has a positive refractive power, the fifth lens L5 has a positive refractive power, and the sixth lens L6 has a negative refractive power.

The first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material. In other embodiments, the lenses may be made of other material.

An on-axis distance from an image side surface of the second lens L2 to an object side surface of the third lens L3 is defined as d4, and an on-axis distance from an image side surface of the third lens L3 to an object side surface of the fourth lens L4 is defined as d6. The camera optical lens 10 should satisfy a condition of $1.00 \leq d4/d6 \leq 2.50$, which specifies a ratio of the on-axis distance from the image side surface of the second lens L2 to the object side surface of the third lens L3 to the on-axis distance from the image side surface of the third lens L3 to the object side surface of the fourth lens L4. This can facilitate reducing the vulnerability of the camera optical lens to an eccentricity of the second lens.

A curvature radius of the image side surface of the third lens L3 is defined as R6, and a curvature radius of an object side surface of the sixth lens L6 is defined as R11. The camera optical lens 10 should satisfy a condition of −5.00≤R6/R11≤−3.20. By controlling a ratio of the curvature radius of the image side surface of the third lens L3 to the curvature radius of the object side surface of the sixth lens L6 to satisfy such condition, development towards ultra-thin lenses can be facilitated.

A curvature radius of the object side surface of the fourth lens L4 is defined as R7, and an on-axis thickness of the fourth lens L4 is defined as d7. The camera optical lens 10 should satisfy a condition of 22.00≤R7/d7≤33.00. This can reasonably control a shape of the fourth lens L3 in such a manner that aberrations of the camera optical lens can be effectively corrected.

A focal length of the third lens L3 is defined as f3, and a focal length of the fourth lens L4 is defined as f4. The camera optical lens 10 should satisfy a condition of −2.00≤f3/f4≤−1.20, which specifies a ratio of the focal length of the third lens L3 to the focal length of the fourth lens L4. The appropriate distribution of the refractive power leads to better imaging quality and a lower sensitivity.

In an embodiment, an object side surface of the first lens L1 is convex in a paraxial region and an image side surface of the first lens L1 is concave in the paraxial region.

A focal length of the camera optical lens 10 is defined as f, and a focal length of the first lens L1 is defined as f1. The camera optical lens 10 should satisfy a condition of 0.41≤f1/f≤1.25, which specifies a ratio of the focal length of the first lens to the focal length of the camera optical lens. When the condition is satisfied, the first lens can have an appropriate positive refractive power, thereby facilitating reducing aberrations of the system while facilitating development towards ultra-thin, wide-angle lenses. As an example, 0.65≤f1/f≤1.00.

A curvature radius of the object side surface of the first lens L1 is defined as R1, and a curvature radius of the image side surface of the first lens L1 is defined as R2. The camera optical lens 10 should satisfy a condition of −3.29≤(R1+R2)/(R1−R2)≤−1.05. This can reasonably control a shape of the first lens L1, so that the first lens L1 can effectively correct spherical aberrations of the system. As an example, −2.05≤(R1+R2)/(R1−R2)≤−1.32.

An on-axis thickness of the first lens L1 is defined as d1, and a total optical length from the object side surface of the first lens L1 to an image plane of the camera optical lens 10 along an optic axis is defined as TTL. The camera optical lens 10 should satisfy a condition of 0.06≤d1/TTL≤0.20. This can facilitate achieving ultra-thin lenses. As an example, 0.10≤d1/TTL≤0.16.

In an embodiment, an object side surface of the second lens L2 is convex in a paraxial region and the image side surface of the second lens L2 is concave in the paraxial region.

The focal length of the camera optical lens 10 is f, and the focal length of the second lens L2 is f2. The camera optical lens 10 further satisfies a condition of −4.16≤f2/f≤−1.34. By controlling the negative refractive power of the second lens L2 within the reasonable range, correction of aberrations of the optical system can be facilitated. As an example, −2.60≤f2/f≤−1.68.

A curvature radius of the object side surface of the second lens L2 is defined as R3, and a curvature radius of the image side surface of the second lens L2 is defined as R4. The camera optical lens 10 should satisfy a condition of 1.20≤(R3+R4)/(R3−R4)≤5.65, which specifies a shape of the second lens L2. This can facilitate correction of an on-axis aberration with development towards ultra-thin, wide-angle lenses. As an example, 1.93≤(R3+R4)/(R3−R4)≤4.52.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of 0.02≤d3/TTL≤0.06. This can facilitate achieving ultra-thin lenses. As an example, 0.03≤d3/TTL≤0.06.

In an embodiment, the object side surface of the third lens L3 is convex in a paraxial region and the image side surface of the third lens L3 is concave in the paraxial region.

The focal length of the camera optical lens 10 is f, and the focal length of the third lens L3 is f3. The camera optical lens 10 further satisfies a condition of −281.40≤f3/f≤−12.17. The appropriate distribution of the refractive power leads to better imaging quality and a lower sensitivity. As an example, −175.87≤f3/f≤−15.22.

A curvature radius of the object side surface of the third lens L3 is defined as R5, and a curvature radius of the image side surface of the third lens L3 is defined as R6. The camera optical lens 10 should satisfy a condition of 1.69≤(R5+R6)/(R5−R6)≤52.32. This specifies a shape of the third lens L3. When the condition is satisfied, the deflection of light passing through the lens can be alleviated, and aberrations can be effectively reduced. As an example, 2.71≤(R5+R6)/(R5−R6)≤41.86.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of 0.03≤d5/TTL≤0.09. This can facilitate achieving ultra-thin lenses. As an example, 0.05≤d5/TTL≤0.08.

The object side surface of the fourth lens L4 is convex in a paraxial region and an image side surface of the fourth lens L4 is concave in the paraxial region.

The focal length of the camera optical lens 10 is f, and the focal length of the fourth lens L4 is f4. The camera optical lens 10 further satisfies a condition of 4.58≤f4/f≤131.90, which specifies a ratio of the focal length of the fourth lens to the focal length of the camera optical lens. The appropriate distribution of the refractive power leads to better imaging quality and a lower sensitivity. As an example, 7.32≤f4/f≤105.52.

A curvature radius of the object side surface of the fourth lens L4 is defined as R7, and a curvature radius of the image side surface of the fourth lens L4 is defined as R8. The camera optical lens 10 should satisfy a condition of −147.87≤(R7+R8)/(R7−R8)≤−4.00, which specifies a shape of the fourth lens L4. This can facilitate correction of an off-axis aberration with development towards ultra-thin, wide-angle lenses. As an example, −92.42≤(R7+R8)/(R7−R8)≤−5.00.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of 0.03≤d7/TTL≤0.09. This can facilitate achieving ultra-thin lenses. As an example, 0.04≤d7/TTL≤0.07.

In an embodiment, an object side surface of the fifth lens L5 is convex in a paraxial region, and an image side surface of the fifth lens L5 is convex in the paraxial region.

The focal length of the camera optical lens 10 is f, and the focal length of the fifth lens L5 is f5. The camera optical lens 10 further satisfies a condition of 0.45≤f5/f≤1.44. This condition can effectively make a light angle of the camera optical lens 10 gentle and reduce the tolerance sensitivity. As an example, $0.73 \le f5/f \le 1.15$.

A curvature radius of the object side surface of the fifth lens L5 is defined as R9, and a curvature radius of the image side surface of the fifth lens L5 is defined as R10. The camera optical lens 10 should satisfy a condition of $0.33 \le (R9+R10)/(R9-R10) \le 1.19$, which specifies a shape of the fifth lens L5. This can facilitate correction of an off-axis aberration with development towards ultra-thin, wide-angle lenses. As an example, $0.53 \le (R9+R10)/(R9-R10) \le 0.95$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.08 \le d9/TTL \le 0.32$. This can facilitate achieving ultra-thin lenses. As an example, $0.09 \le d9/TTL \le 0.25$.

In an embodiment, the object side surface of the sixth lens L6 is concave in a paraxial region, and an image side surface of the sixth lens L6 is concave in the paraxial region.

The focal length of the camera optical lens 10 is f, and the focal length of the sixth lens L6 is f6. The camera optical lens 10 further satisfies a condition of $-1.24 \le f6/f \le -0.39$. The appropriate distribution of the refractive power leads to better imaging quality and a lower sensitivity. As an example, $-0.78 \le f6/f \le -0.49$.

A curvature radius of the object side surface of the sixth lens L6 is defined as R11, and a curvature radius of the image side surface of the sixth lens L6 is defined as R12. The camera optical lens 10 should satisfy a condition of $0.12 \le (R11+R12)/(R11-R12) \le 0.46$, which specifies a shape of the sixth lens L6. This can facilitate correction of an off-axis aberration with development towards ultra-thin, wide-angle lenses. As an example, $0.18 \le (R11+R12)/(R11-R12) \le 0.37$.

An on-axis thickness of the sixth lens L6 is defined as d11, and the total optical length from the object side surface of the first lens L1 to an image plane of the camera optical lens 10 along an optic axis is defined as TTL. The camera optical lens 10 should satisfy a condition of $0.05 \le d11/TTL \le 0.14$. This can facilitate achieving ultra-thin lenses. As an example, $0.07 \le d11/TTL \le 0.11$.

In this embodiment, the total optical length TTL of the camera optical lens 10 is smaller than or equal to 7.15 mm, which is beneficial for achieving ultra-thin lenses. As an example, the total optical length TTL of the camera optical lens 10 is smaller than or equal to 6.82 mm.

In this embodiment, an F number of the camera optical lens 10 is smaller than or equal to 1.96. The camera optical lens 10 has a large aperture and better imaging performance. As an example, the F number of the camera optical lens 10 is smaller than or equal to 1.92.

With such design, the total optical length TTL of the camera optical lens 10 can be made as short as possible, and thus the miniaturization characteristics can be maintained.

The focal length of the camera optical lens is defines as f, and a combined focal length of the first lens L1 and the second lens L2 is defined as f12. The camera optical lens 10 should satisfy a condition of $0.58 \le f12/f \le 1.79$. This can eliminate aberration and distortion of the camera optical lens, suppress the back focal length of the camera optical lens, and maintain miniaturization of the camera lens system group. As an example, $0.94 \le f12/f \le 1.43$.

When the above conditions are satisfied, the camera optical lens 10 will have high optical performance while satisfying design requirements for ultra-thin, wide-angle lenses having large apertures. With these characteristics, the camera optical lens 10 is especially suitable for high-pixel camera optical lens assembly of mobile phones and WEB camera optical lenses formed by imaging elements such as CCD and CMOS.

In the following, examples will be used to describe the camera optical lens 10 of the present invention. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image plane of the camera optical lens along the optic axis) in mm.

F number (FNO): a ratio of an effective focal length of the camera optical lens to an entrance pupil diameter of the camera optical lens.

In an example, inflexion points and/or arrest points can be arranged on the object side surface and/or image side surface of the lens, so as to satisfy the demand for the high quality imaging. The description below can be referred to for specific implementations.

Table 1 and Table 2 show design data of the camera optical lens 10 according to Embodiment 1 of the present invention.

TABLE 1

| | R | d | | nd | | vd |
|---|---|---|---|---|---|---|
| S1 | ∞ | d0 = | −0.598 | | | |
| R1 | 1.989 | d1 = | 0.841 | nd1 | 1.5444 | v1 | 55.82 |
| R2 | 8.244 | d2 = | 0.107 | | | |
| R3 | 5.316 | d3 = | 0.250 | nd2 | 1.6700 | v2 | 19.39 |
| R4 | 3.086 | d4 = | 0.410 | | | |
| R5 | 19.832 | d5 = | 0.400 | nd3 | 1.5661 | v3 | 37.71 |
| R6 | 14.894 | d6 = | 0.164 | | | |
| R7 | 13.339 | d7 = | 0.404 | nd4 | 1.5844 | v4 | 28.22 |
| R8 | 17.639 | d8 = | 0.372 | | | |
| R9 | 15.457 | d9 = | 1.372 | nd5 | 1.5444 | v5 | 55.82 |
| R10 | −3.194 | d10 = | 0.578 | | | |
| R11 | −4.647 | d11 = | 0.600 | nd6 | 1.5346 | v6 | 55.69 |
| R12 | 2.907 | d12 = | 0.460 | | | |
| R13 | ∞ | d13 = | 0.210 | ndg | 1.5168 | vg | 64.20 |
| R14 | ∞ | d14 = | 0.328 | | | |

In the table, meanings of various symbols will be described as follows.

S1: aperture;

R: curvature radius of an optical surface, central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of an object side surface of the optical filter GF;

R14: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;

d14: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Table 2 shows aspheric surface data of respective lens in the camera optical lens 10 according to Embodiment 1 of the present invention.

TABLE 2

| | Conic coefficient | Aspherical surface coefficients | | | | |
| --- | --- | --- | --- | --- | --- | --- |
| | k | A4 | A6 | A8 | A10 | A12 |
| R1 | −7.9607E−01 | 5.9806E−03 | 5.0227E−02 | −1.2839E−01 | 1.9625E−01 | −1.8146E−01 |
| R2 | 0.0000E+00 | −6.6288E−02 | 1.4186E−01 | −2.8043E−01 | 4.3509E−01 | −4.6343E−01 |
| R3 | 0.0000E+00 | −1.0952E−01 | 2.3976E−01 | −5.0567E−01 | 9.2398E−01 | −1.1555E+00 |
| R4 | 0.0000E+00 | −5.1956E−02 | 1.3775E−01 | −3.0490E−01 | 6.7327E−01 | −9.6023E−01 |
| R5 | 0.0000E+00 | −6.2350E−02 | 1.0738E−01 | −3.0815E−01 | 5.8928E−01 | −7.4294E−01 |
| R6 | 0.0000E+00 | −1.0762E−01 | 1.6754E−01 | −3.3639E−01 | 4.6294E−01 | −4.2073E−01 |
| R7 | 0.0000E+00 | −1.0624E−01 | 4.4522E−02 | 3.7187E−02 | −1.0989E−01 | 1.1702E−01 |
| R8 | 0.0000E+00 | −7.8564E−02 | 2.0830E−02 | 2.9195E−02 | −4.7321E−02 | 3.8240E−02 |
| R9 | 0.0000E+00 | −2.9248E−02 | 8.5525E−04 | 5.7511E−03 | −4.6626E−03 | 2.3736E−03 |
| R10 | 0.0000E+00 | 1.3794E−02 | −6.5729E−03 | −4.1094E−04 | 2.5953E−03 | −1.5012E−03 |
| R11 | −1.0000E+00 | −8.1629E−02 | 3.3395E−02 | −1.6650E−02 | 8.1847E−03 | −2.8071E−03 |
| R12 | −1.3341E+01 | −3.7656E−02 | 1.1669E−02 | −2.8904E−03 | 5.4192E−04 | −7.5735E−05 |
| | Conic coefficient | Aspherical surface coefficients | | | | |
| | k | A14 | A16 | A18 | A20 | |
| R1 | −7.9607E−01 | 1.0443E−01 | −3.6839E−02 | 7.3720E−03 | −6.4998E−04 | |
| R2 | 0.0000E+00 | 3.2342E−01 | −1.4134E−01 | 3.5124E−02 | −3.7986E−03 | |
| R3 | 0.0000E+00 | 9.2994E−01 | −4.6047E−01 | 1.2781E−01 | −1.5264E−02 | |
| R4 | 0.0000E+00 | 8.5891E−01 | −4.7119E−01 | 1.4873E−01 | −2.0975E−02 | |
| R5 | 0.0000E+00 | 5.9760E−01 | −2.8770E−01 | 7.4031E−02 | −7.3840E−03 | |
| R6 | 0.0000E+00 | 2.4450E−01 | −8.3299E−02 | 1.4217E−02 | −8.0330E−04 | |
| R7 | 0.0000E+00 | −6.3858E−02 | 1.8444E−02 | −2.5477E−03 | 1.0870E−04 | |
| R8 | 0.0000E+00 | −1.7583E−02 | 4.5781E−03 | −6.3044E−04 | 3.5622E−05 | |
| R9 | 0.0000E+00 | −7.3973E−04 | 1.3432E−04 | −1.3148E−05 | 5.3907E−07 | |
| R10 | 0.0000E+00 | 4.1855E−04 | −6.2754E−05 | 4.8600E−06 | −1.5278E−07 | |
| R11 | −1.0000E+00 | 5.8253E−04 | −6.9171E−05 | 4.3368E−06 | −1.1172E−07 | |
| R12 | −1.3341E+01 | 7.3322E−06 | −4.5329E−07 | 1.5958E−08 | −2.4237E−10 | |

In Table 2, k is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

where x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

In an embodiment, an aspheric surface of each lens surface may use the aspheric surfaces shown in the above condition (1). However, the present invention is not limited to the aspherical polynomials form shown in the condition (1).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively; and P6R1 and P6R2 represent the object side surface and the image side surface of the sixth lens L6, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 0 | / | / | / |
| P1R2 | 1 | 1.275 | / | / |
| P2R1 | 0 | / | / | / |
| P2R2 | 0 | / | / | / |
| P3R1 | 2 | 0.305 | 1.065 | / |
| P3R2 | 2 | 0.255 | 1.195 | / |
| P4R1 | 3 | 0.255 | 1.095 | 1.405 |
| P4R2 | 3 | 0.255 | 1.095 | 1.665 |
| P5R1 | 3 | 0.445 | 1.525 | 1.905 |
| P5R2 | 1 | 2.185 | / | / |
| P6R1 | 1 | 2.115 | / | / |
| P6R2 | 3 | 0.705 | 3.465 | 3.665 |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.535 | / |
| P3R2 | 1 | 0.475 | / |
| P4R1 | 1 | 0.455 | / |
| P4R2 | 2 | 0.445 | 1.435 |
| P5R1 | 1 | 0.795 | / |
| P5R2 | 0 | / | / |
| P6R1 | 0 | / | / |
| P6R2 | 1 | 1.605 | / |

Figure 2:
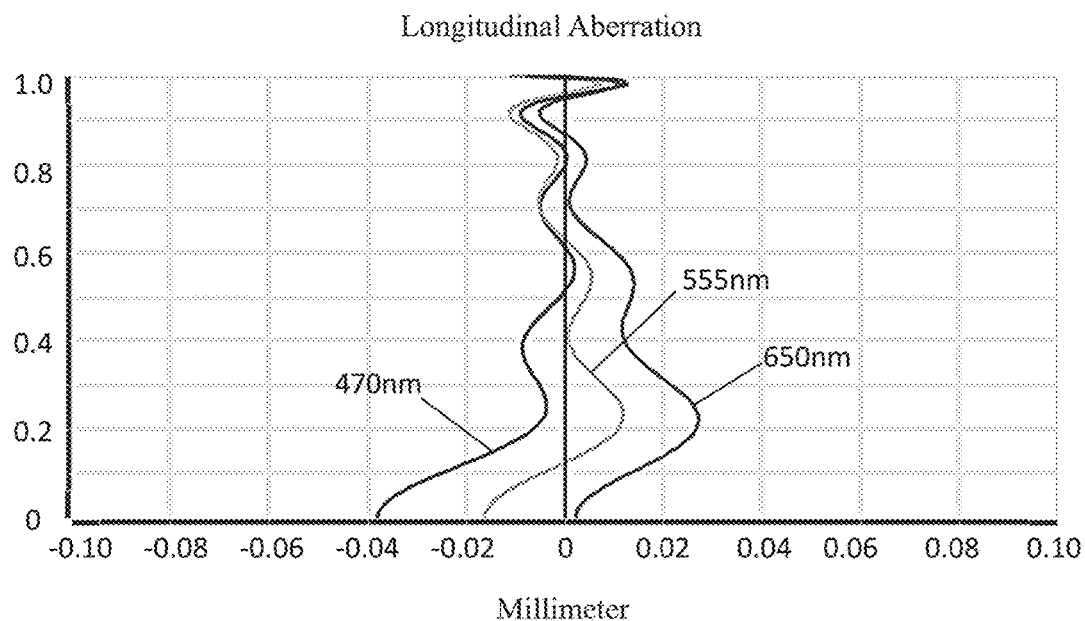
FIG. 2 is a schematic diagram of a longitudinal aberration of the camera optical lens shown in FIG. 1.
Figure 3:
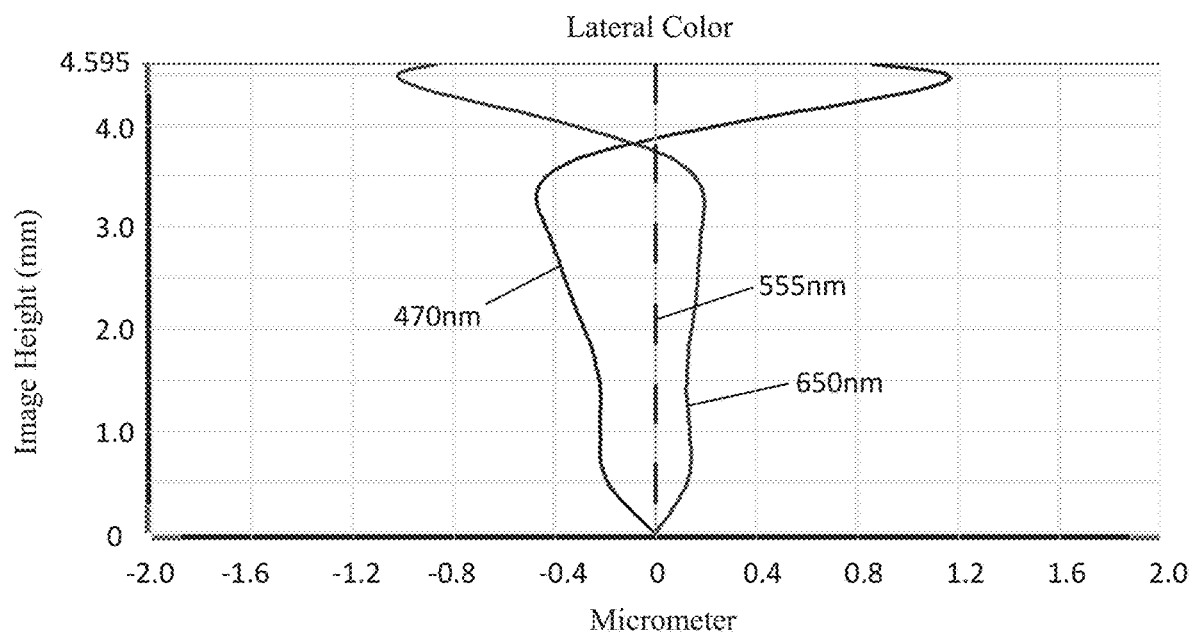
FIG. 3 is a schematic diagram of a lateral color of the camera optical lens shown in FIG. 1.
Figure 4:
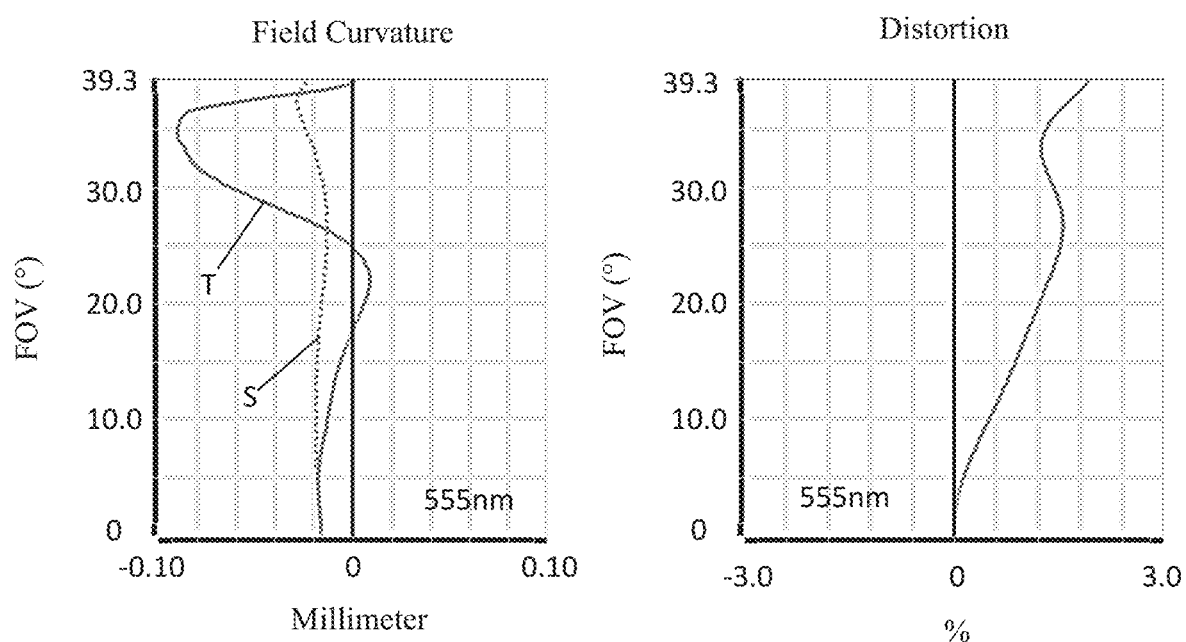
FIG. 4 is a schematic diagram of a field curvature and a distortion of the camera optical lens shown in FIG. 1.
Figure 5:
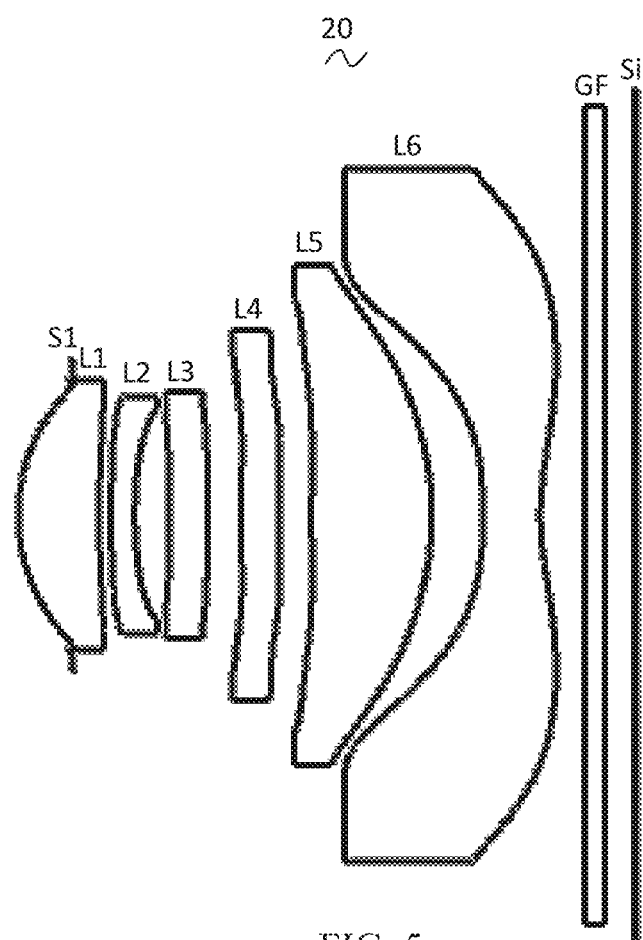
FIG. 5 is a schematic diagram of a structure of a camera optical lens in accordance with Embodiment 2 of the present invention.

FIG. 2 and FIG. 3 illustrate a longitudinal aberration and a lateral color of light with wavelengths of 470 nm, 555 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 below further lists various values of Embodiments 1, 2 and 3 and values corresponding to parameters which are specified in the above conditions.

As shown in Table 13, Embodiment 1 satisfies the respective conditions.

In this embodiment, the entrance pupil diameter (ENPD) of the camera optical lens 10 is 2.880 mm. The image height of 1.0H is 4.595 mm. The FOV (field of view) along a diagonal direction is 77.45°. Thus, the camera optical lens can provide a large-aperture, ultra-thin, wide-angle lens while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

Table 5 and Table 6 show design data of a camera optical lens 20 in Embodiment 2 of the present invention.

TABLE 5

| | R | d | nd | | vd | |
|---|---|---|---|---|---|---|
| S1 | ∞ | d0 = -0.577 | | | | |
| R1 | 1.968 | d1 = 0.850 | nd1 | 1.5444 | v1 | 55.82 |
| R2 | 8.743 | d2 = 0.124 | | | | |
| R3 | 10.456 | d3 = 0.250 | nd2 | 1.6700 | v2 | 19.39 |
| R4 | 4.317 | d4 = 0.357 | | | | |
| R5 | 47.557 | d5 = 0.400 | nd3 | 1.5661 | v3 | 37.71 |
| R6 | 25.860 | d6 = 0.355 | | | | |
| R7 | 8.802 | d7 = 0.400 | nd4 | 1.5844 | v4 | 28.22 |
| R8 | 12.321 | d8 = 0.345 | | | | |
| R9 | 27.231 | d9 = 1.262 | nd5 | 1.5444 | v5 | 55.82 |
| R10 | -3.175 | d10 = 0.538 | | | | |
| R11 | -5.177 | d11 = 0.600 | nd6 | 1.5346 | v6 | 55.69 |
| R12 | 2.873 | d12 = 0.460 | | | | |
| R13 | ∞ | d13 = 0.210 | ndg | 1.5168 | vg | 64.20 |
| R14 | ∞ | d14 = 0.346 | | | | |

Table 6 shows aspheric surface data of respective lenses in the camera optical lens 20 according to Embodiment 2 of the present invention.

TABLE 6

| | Conic coefficient | Aspherical surface coefficients | | | | |
|---|---|---|---|---|---|---|
| | k | A4 | A6 | A8 | A10 | A12 |
| R1 | -8.2200E-01 | 5.2185E-03 | 4.9567E-02 | -1.2612E-01 | 1.9316E-01 | -1.8031E-01 |
| R2 | 0.0000E+00 | -5.7012E-02 | 1.3977E-01 | -3.3758E-01 | 5.7373E-01 | -6.3228E-01 |
| R3 | 0.0000E+00 | -6.1174E-02 | 1.4015E-01 | -2.4061E-01 | 4.1675E-01 | -5.2458E-01 |
| R4 | 0.0000E+00 | -2.7276E-02 | 1.3517E-01 | -3.0227E-01 | 6.6627E-01 | -9.6410E-01 |
| R5 | 0.0000E+00 | -6.5169E-02 | 1.0895E-01 | -3.0637E-01 | 5.9057E-01 | -7.3677E-01 |
| R6 | 0.0000E+00 | -8.8815E-02 | 1.9974E-01 | -5.0503E-01 | 8.3564E-01 | -8.8185E-01 |
| R7 | 0.0000E+00 | -9.0595E-02 | 1.3171E-01 | -2.5023E-01 | 2.9968E-01 | -2.2407E-01 |
| R8 | 0.0000E+00 | -4.5831E-02 | -1.9011E-02 | 4.3671E-02 | -4.5663E-02 | 2.9997E-02 |

TABLE 6-continued

| | | | | | |
|---|---|---|---|---|---|
| R9 | 0.0000E+00 | −2.0593E−02 | 8.1115E−04 | 1.3331E−04 | −2.1718E−03 | 2.4559E−03 |
| R10 | 0.0000E+00 | 1.9069E−02 | −9.9616E−03 | 3.1825E−03 | 5.3471E−06 | −4.3727E−04 |
| R11 | −1.0000E+00 | −6.6739E−02 | 1.8022E−02 | −6.4480E−03 | 3.5657E−03 | −1.4043E−03 |
| R12 | −1.0723E+01 | −3.5535E−02 | 9.2884E−03 | −1.8444E−03 | 2.7445E−04 | −3.2212E−05 |

| | Conic coefficient | Aspherical surface coefficients | | | |
|---|---|---|---|---|---|
| | k | A14 | A16 | A18 | A20 |
| R1 | −8.2200E−01 | 1.0451E−01 | −3.6995E−02 | 7.3845E−03 | −6.5144E−04 |
| R2 | 0.0000E+00 | 4.4247E−01 | −1.9033E−01 | 4.5900E−02 | −4.7573E−03 |
| R3 | 0.0000E+00 | 4.3123E−01 | −2.1893E−01 | 6.2429E−02 | −7.6662E−03 |
| R4 | 0.0000E+00 | 8.7811E−01 | −4.8381E−01 | 1.4868E−01 | −1.9445E−02 |
| R5 | 0.0000E+00 | 5.9313E−01 | −2.8982E−01 | 7.5183E−02 | −7.0737E−03 |
| R6 | 0.0000E+00 | 5.9405E−01 | −2.4589E−01 | 5.6763E−02 | −5.5720E−03 |
| R7 | 0.0000E+00 | 1.0694E−01 | −3.1534E−02 | 5.2103E−03 | −3.6819E−04 |
| R8 | 0.0000E+00 | −1.1510E−02 | 2.5145E−03 | −2.9168E−04 | 1.3978E−05 |
| R9 | 0.0000E+00 | −1.0466E−03 | 2.2065E−04 | −2.3397E−05 | 1.0013E−06 |
| R10 | 0.0000E+00 | 1.6416E−04 | −2.7428E−05 | 2.2063E−06 | −6.9144E−08 |
| R11 | −1.0000E+00 | 3.1061E−04 | −3.7440E−05 | 2.3160E−06 | −5.7790E−08 |
| R12 | −1.0723E+01 | 2.8077E−06 | −1.6387E−07 | 5.6071E−09 | −8.4231E−11 |

Table 7 and Table 8 show design data of inflexion points and arrest points of respective lens in the camera optical lens 20 according to Embodiment 2 of the present invention.

TABLE 7

| | Number of inflexion points | Inflexion point position 1 | Inflexion point position 2 | Inflexion point position 3 | Inflexion point position 4 |
|---|---|---|---|---|---|
| P1R1 | 1 | 1.375 | / | / | / |
| P1R2 | 1 | 0.975 | / | / | / |
| P2R1 | 0 | / | / | / | / |
| P2R2 | 0 | / | / | / | / |
| P3R1 | 2 | 0.175 | 1.015 | / | / |
| P3R2 | 2 | 0.215 | 1.125 | / | / |
| P4R1 | 3 | 0.405 | 1.295 | 1.545 | / |
| P4R2 | 3 | 0.375 | 1.305 | 1.795 | 1.925 |
| P5R1 | 3 | 0.395 | 1.525 | 1.915 | 2.255 |
| P5R2 | 1 | 2.425 | / | / | / |
| P6R1 | 2 | 2.125 | 2.945 | / | / |
| P6R2 | 3 | 0.745 | 3.515 | 3.735 | / |

TABLE 8

| | Number of arrest points | Arrest point position 1 | Arrest point position 2 |
|---|---|---|---|
| P1R1 | 0 | / | / |
| P1R2 | 1 | 1.285 | / |
| P2R1 | 0 | / | / |
| P2R2 | 0 | / | / |
| P3R1 | 2 | 0.315 | 1.165 |
| P3R2 | 1 | 0.405 | / |
| P4R1 | 1 | 0.715 | / |
| P4R2 | 1 | 0.645 | / |
| P5R1 | 1 | 0.675 | / |
| P5R2 | 0 | / | / |
| P6R1 | 1 | 2.855 | / |
| P6R2 | 1 | 1.675 | / |

Figure 6:
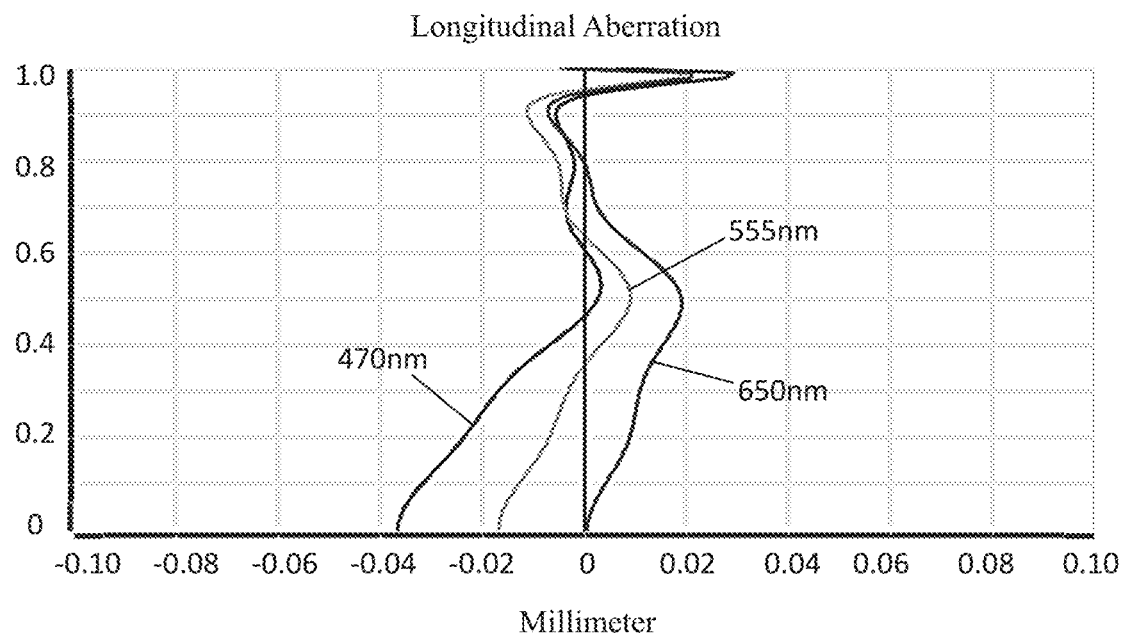
FIG. 6 is a schematic diagram of a longitudinal aberration of the camera optical lens shown in FIG. 5.
Figure 7:
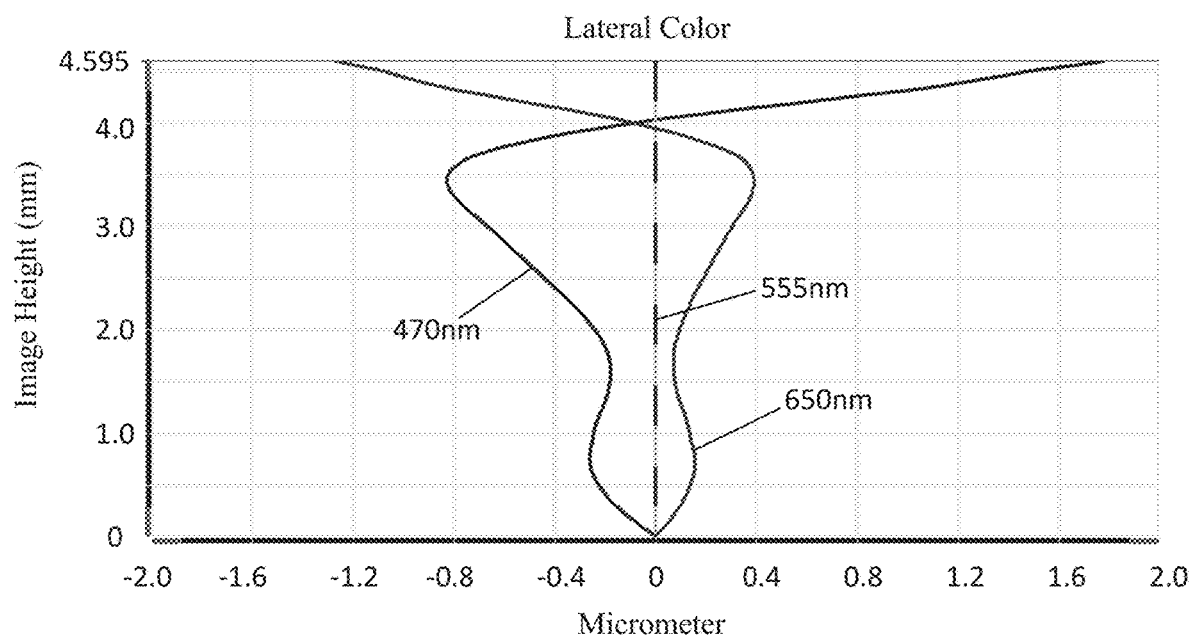
FIG. 7 is a schematic diagram of a lateral color of the camera optical lens shown in FIG. 5.
Figure 8:
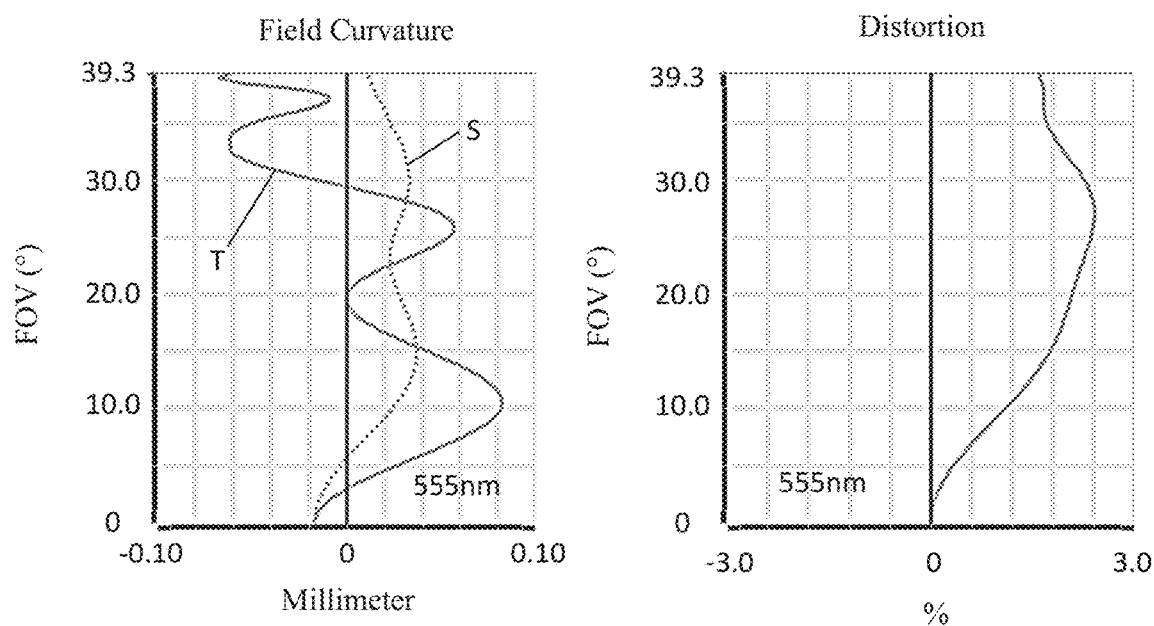
FIG. 8 is a schematic diagram of a field curvature and a distortion of the camera optical lens shown in FIG. 5.
Figure 9:
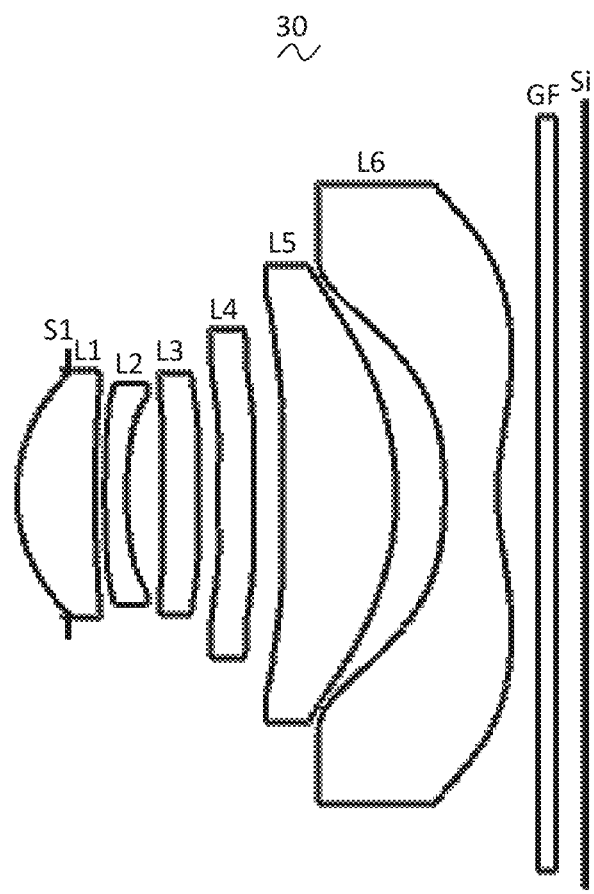
FIG. 9 is a schematic diagram of a structure of a camera optical lens in accordance with Embodiment 3 of the present invention.

FIG. 6 and FIG. 7 illustrate a longitudinal aberration and a lateral color of light with wavelengths of 470 nm, 555 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 13, Embodiment 2 satisfies the respective conditions.

In this embodiment, the entrance pupil diameter (ENPD) of the camera optical lens 20 is 2.890 mm. The image height of 1.0H is 4.595 mm. The FOV (field of view) along a diagonal direction is 78.630. Thus, the camera optical lens 20 can provide a large-aperture, ultra-thin, wide-angle lens while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

Table 9 and Table 10 show design data of a camera optical lens 30 in Embodiment 3 of the present invention.

TABLE 9

| | R | d | nd | | vd | |
|---|---|---|---|---|---|---|
| S1 | ∞ | d0 = −0.582 | | | | |
| R1 | 1.956 | d1 = 0.884 | nd1 | 1.5444 | v1 | 55.82 |
| R2 | 8.040 | d2 = 0.116 | | | | |
| R3 | 9.342 | d3 = 0.250 | nd2 | 1.6700 | v2 | 19.39 |
| R4 | 4.145 | d4 = 0.412 | | | | |
| R5 | 22.925 | d5 = 0.400 | nd3 | 1.5661 | v3 | 37.71 |
| R6 | 21.647 | d6 = 0.229 | | | | |
| R7 | 11.200 | d7 = 0.400 | nd4 | 1.5844 | v4 | 28.22 |
| R8 | 11.507 | d8 = 0.322 | | | | |
| R9 | 18.953 | d9 = 1.305 | nd5 | 1.5444 | v5 | 55.82 |
| R10 | −3.203 | d10 = 0.551 | | | | |
| R11 | −5.412 | d11 = 0.600 | nd6 | 1.5346 | v6 | 55.69 |
| R12 | 2.866 | d12 = 0.460 | | | | |
| R13 | ∞ | d13 = 0.210 | ndg | 1.5168 | vg | 64.20 |
| R14 | ∞ | d14 = 0.342 | | | | |

Table 10 shows aspheric surface data of respective lenses in the camera optical lens 30 according to Embodiment 3 of the present invention.

TABLE 10

| | Conic coefficient | Aspherical surface coefficients | | | | |
|---|---|---|---|---|---|---|
| | k | A4 | A6 | A8 | A10 | A12 |
| R1  | −8.0427E−01 | 5.3368E−03 | 5.1051E−02 | −1.2949E−01 | 1.9633E−01 | −1.8120E−01 |
| R2  | 0.0000E+00 | −7.0083E−02 | 1.9587E−01 | −4.8404E−01 | 8.0898E−01 | −8.7389E−01 |
| R3  | 0.0000E+00 | −7.0040E−02 | 1.6725E−01 | −3.0903E−01 | 5.0882E−01 | −5.9025E−01 |
| R4  | 0.0000E+00 | −2.8393E−02 | 1.3949E−01 | −3.1404E−01 | 6.6975E−01 | −9.5183E−01 |
| R5  | 0.0000E+00 | −6.0999E−02 | 1.0273E−01 | −3.0690E−01 | 5.8951E−01 | −7.3866E−01 |
| R6  | 0.0000E+00 | −4.9287E−02 | −4.2929E−02 | 2.0618E−01 | −4.3799E−01 | 5.3872E−01 |
| R7  | 0.0000E+00 | −7.9350E−02 | 3.2949E−02 | −2.8582E−02 | 2.5270E−02 | −2.0349E−02 |
| R8  | 0.0000E+00 | −5.6970E−02 | −2.4902E−02 | 7.1654E−02 | −7.9399E−02 | 5.2286E−02 |
| R9  | 0.0000E+00 | −1.9316E−02 | −8.8105E−03 | 1.0675E−02 | −8.0247E−03 | 4.3007E−03 |
| R10 | 0.0000E+00 | 2.2235E−02 | −1.2147E−02 | 3.7296E−03 | 6.1242E−05 | −4.8607E−04 |
| R11 | −1.0000E+00 | −6.5050E−02 | 1.5356E−02 | −5.9185E−03 | 3.5846E−03 | −1.3916E−03 |
| R12 | −1.0101E+01 | −3.7389E−02 | 9.9248E−03 | −2.1502E−03 | 3.6316E−04 | −4.7784E−05 |

| | Conic coefficient | Aspherical surface coefficients | | | |
|---|---|---|---|---|---|
| | k | A14 | A16 | A18 | A20 |
| R1  | −8.0427E−01 | 1.0420E−01 | −3.6802E−02 | 7.3691E−03 | −6.5322E−04 |
| R2  | 0.0000E+00 | 6.0133E−01 | −2.5483E−01 | 6.0623E−02 | −6.2047E−03 |
| R3  | 0.0000E+00 | 4.4901E−01 | −2.1205E−01 | 5.6448E−02 | −6.4935E−03 |
| R4  | 0.0000E+00 | 8.6487E−01 | −4.7929E−01 | 1.4885E−01 | −1.9782E−02 |
| R5  | 0.0000E+00 | 5.9523E−01 | −2.8985E−01 | 7.5527E−02 | −7.5903E−03 |
| R6  | 0.0000E+00 | −4.0202E−01 | 1.8188E−01 | −4.6025E−02 | 4.9992E−03 |
| R7  | 0.0000E+00 | 1.6118E−02 | −7.8664E−03 | 1.9073E−03 | −1.7946E−04 |
| R8  | 0.0000E+00 | −2.0181E−02 | 4.4838E−03 | −5.3366E−04 | 2.6430E−05 |
| R9  | 0.0000E+00 | −1.3871E−03 | 2.5632E−04 | −2.5290E−05 | 1.0390E−06 |
| R10 | 0.0000E+00 | 1.7524E−04 | −2.9160E−05 | 2.3886E−06 | −7.7560E−08 |
| R11 | −1.0000E+00 | 2.9996E−04 | −3.5469E−05 | 2.1668E−06 | −5.3673E−08 |
| R12 | −1.0101E+01 | 4.4978E−06 | −2.7555E−07 | 9.7406E−09 | −1.4977E−10 |

Table 11 and Table 12 show design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 | Inflexion point position 4 |
|---|---|---|---|---|---|
| P1R1 | 1 | 1.395 | / | / | / |
| P1R2 | 1 | 0.975 | / | / | / |
| P2R1 | 0 | / | / | / | / |
| P2R2 | 0 | / | / | / | / |
| P3R1 | 2 | 0.275 | 1.095 | / | / |
| P3R2 | 2 | 0.275 | 1.175 | / | / |
| P4R1 | 3 | 0.325 | 1.195 | 1.545 | / |
| P4R2 | 3 | 0.355 | 1.275 | 1.765 | / |
| P5R1 | 4 | 0.455 | 1.585 | 1.865 | 2.295 |
| P5R2 | 1 | 2.365 | / | / | / |
| P6R1 | 1 | 2.115 | / | / | / |
| P6R2 | 2 | 0.745 | 3.385 | / | / |

TABLE 12

| | Number of arrest points | Arrest point position 1 | Arrest point position 2 | Arrest point position 3 |
|---|---|---|---|---|
| P1R1 | 0 | / | / | / |
| P1R2 | 1 | 1.295 | / | / |
| P2R1 | 0 | / | / | / |
| P2R2 | 0 | / | / | / |
| P3R1 | 1 | 0.495 | / | / |
| P3R2 | 1 | 0.475 | / | / |
| P4R1 | 1 | 0.575 | / | / |
| P4R2 | 3 | 0.605 | 1.725 | 1.795 |
| P5R1 | 1 | 0.765 | / | / |
| P5R2 | 0 | / | / | / |
| P6R1 | 1 | 2.865 | / | / |
| P6R2 | 1 | 1.625 | / | / |

Figure 10:
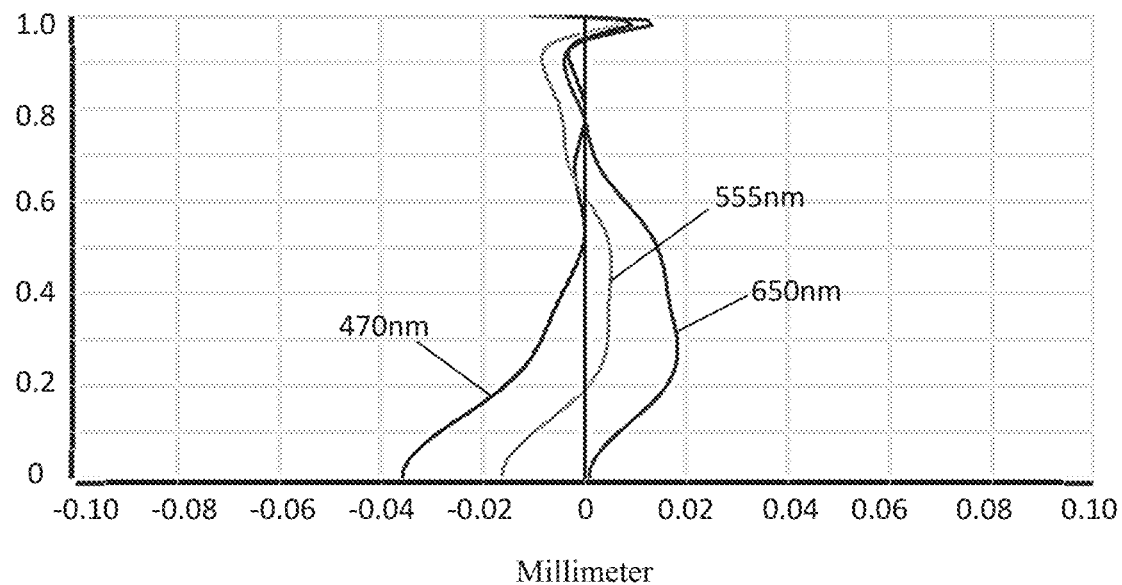
FIG. 10 is a schematic diagram of a longitudinal aberration of the camera optical lens shown in FIG. 9.
Figure 11:
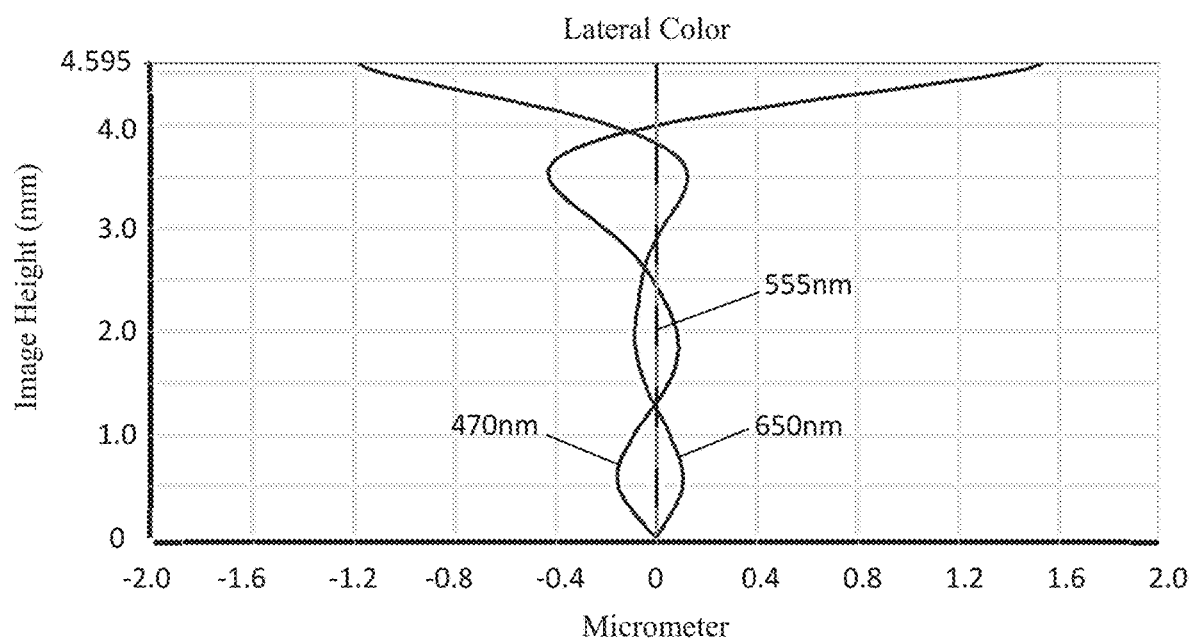
FIG. 11 is a schematic diagram of a lateral color of the camera optical lens shown in FIG. 9.
Figure 12:
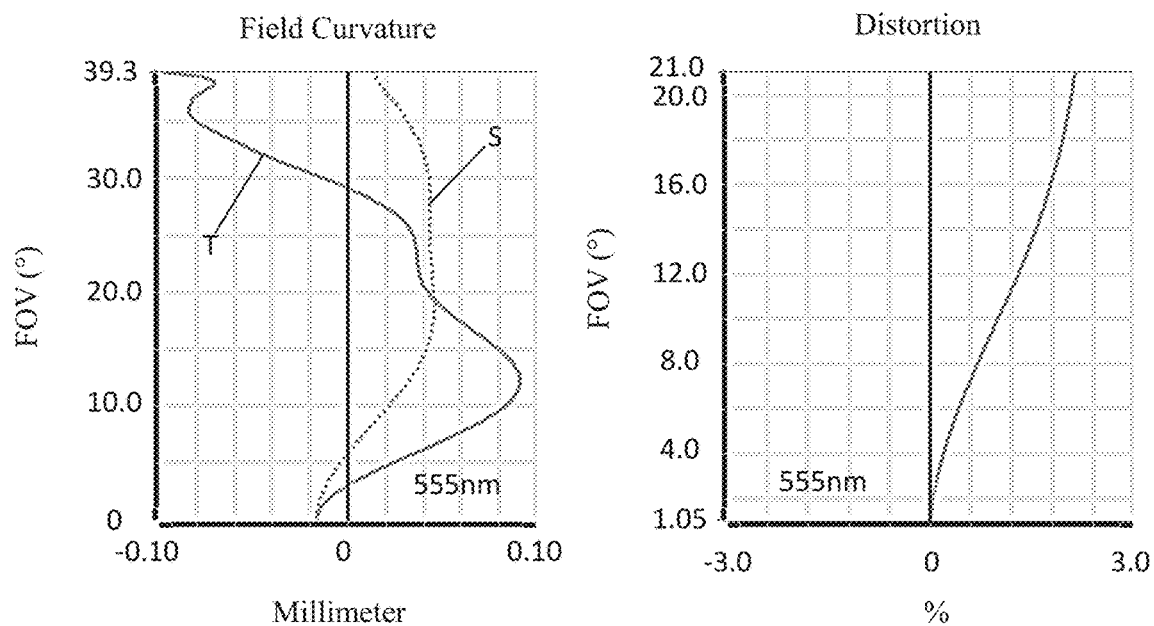
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 470 nm, 555 nm and 650 nm after passing the camera optical lens 30 according to Embodiment 3. FIG. 12 illustrates field curvature and distortion of light with a wavelength of 555 nm after passing the camera optical lens 30 according to Embodiment 3.

Table 13 below further lists various values of the present embodiment and values corresponding to parameters which are specified in the above conditions. Obviously, the camera optical lens according to this embodiment satisfies the above conditions.

In this embodiment, the entrance pupil diameter (ENPD) of the camera optical lens 30 is 2.880 mm. The image height of 1.0H is 4.595 mm. The FOV (field of view) along a diagonal direction is 78.62°. Thus, the camera optical lens 30 can provide a large-aperture, ultra-thin, wide-angle lens while having on-axis and off-axis aberrations sufficiently corrected, thereby leading to better optical characteristics.

TABLE 13

| Parameters and Conditions | Embodiment 1 | Embodiment 2 | Embodiment 3 |
|---|---|---|---|
| d4/d6 | 2.50 | 1.01 | 1.80 |
| R6/R11 | −3.2 | −4.99 | −4.00 |
| R7/d7 | 33.00 | 22.00 | 28.00 |
| f3/f4 | −1.21 | −2.00 | −1.60 |

TABLE 13-continued

| Parameters and Conditions | Embodiment 1 | Embodiment 2 | Embodiment 3 |
|---|---|---|---|
| f | 5.478 | 5.494 | 5.474 |
| f1 | 4.581 | 4.454 | 4.502 |
| f2 | −11.395 | −11.056 | −11.236 |
| f3 | −108.341 | −100.322 | −770.167 |
| f4 | 89.909 | 50.287 | 481.354 |
| f5 | 4.976 | 5.283 | 5.124 |
| f6 | −3.244 | −3.357 | −3.407 |
| f12 | 6.542 | 6.425 | 6.451 |
| FNO | 1.90 | 1.90 | 1.90 |
| TTL | 6.496 | 6.497 | 6.480 |
| IH | 4.595 | 4.595 | 4.595 |
| FOV | 77.45° | 78.63° | 78.62° |

It can be appreciated by one having ordinary skill in the art that the description above is only embodiments of the present invention. In practice, one having ordinary skill in the art can make various modifications to these embodiments in forms and details without departing from the spirit and scope of the present invention.

What is claimed is:

1. A camera optical lens, comprising, sequentially from an object side to an image side:
    a first lens having a positive refractive power;
    a second lens having a negative refractive power;
    a third lens having a negative refractive power;
    a fourth lens having a positive refractive power;
    a fifth lens having a positive refractive power; and
    a sixth lens having a negative refractive power,
    wherein the camera optical lens satisfies following conditions:

$1.00 \leq d4/d6 \leq 2.50$;

$-5.00 \leq R6/R11 \leq -3.20$;

$22.00 \leq R7/d7 \leq 33.00$; and $-2.00 \leq f3/f4 \leq -1.20$, where
    f3 denotes a focal length of the third lens;
    f4 denotes a focal length of the fourth lens;
    R6 denotes a curvature radius of an image side surface of the third lens;
    R7 denotes a curvature radius of an object side surface of the fourth lens;
    R11 denotes a curvature radius of an object side surface of the sixth lens;
    d4 denotes an on-axis distance from an image side surface of the second lens to an object side surface of the third lens;
    d6 denotes an on-axis distance from the image side surface of the third lens to the object side surface of the fourth lens; and
    d7 denotes an on-axis thickness of the fourth lens.

2. The camera optical lens as described in claim 1, wherein the first lens comprises an object side surface being convex in a paraxial region and an image side surface being concave in the paraxial region, and the camera optical lens satisfies following conditions:

$0.41 \leq f1/f \leq 1.25$;

$-3.29 \leq (R1+R2)/(R1-R2) \leq -1.05$; and $0.06 \leq d1/TTL \leq 0.20$, where
    f denotes a focal length of the camera optical lens;
    f1 denotes a focal length of the first lens;
    R1 denotes a curvature radius of the object side surface of the first lens;
    R2 denotes a curvature radius of the image side surface of the first lens;
    d1 denotes an on-axis thickness of the first lens; and
    TTL denotes a total optical length from the object side surface of the first lens to an image plane of the camera optical lens along an optic axis.

3. The camera optical lens as described in claim 2, further satisfying following conditions:

$0.65 \leq f1/f \leq 1.00$;

$-2.05 \leq (R1+R2)/(R1-R2) \leq -1.32$; and $0.10 \leq d1/TTL \leq 0.16$.

4. The camera optical lens as described in claim 1, wherein the second lens further comprises an object side surface being convex in a paraxial region, the image side surface of the second lens is concave in the paraxial region, and the camera optical lens satisfies following conditions:

$-4.16 \leq f2/f \leq -1.34$;

$1.20 \leq (R3+R4)/(R3-R4) \leq 5.65$; and $0.02 \leq d3/TTL \leq 0.06$, where
    f denotes a focal length of the camera optical lens;
    f2 denotes a focal length of the second lens;
    R3 denotes a curvature radius of the object side surface of the second lens;
    R4 denotes a curvature radius of the image side surface of the second lens;
    d3 denotes an on-axis thickness of the second lens; and
    TTL denotes a total optical length from an object side surface of the first lens to an image plane of the camera optical lens along an optic axis.

5. The camera optical lens as described in claim 4, further satisfying following conditions:

$-2.60 \leq f2/f \leq -1.68$;

$1.93 \leq (R3+R4)/(R3-R4) \leq 4.52$; and $0.03 \leq d3/TTL \leq 0.06$.

6. The camera optical lens as described in claim 1, wherein the object side surface of the third lens is convex in a paraxial region, the image side surface of the third lens is concave in the paraxial region, and the camera optical lens satisfies following conditions:

$-281.40 \leq f3/f \leq -12.17$;

$1.69 \leq (R5+R6)/(R5-R6) \leq 52.32$; and $0.03 \leq d5/TTL \leq 0.09$, where
    f denotes a focal length of the camera optical lens;
    R5 denotes a curvature radius of the object side surface of the third lens;
    R6 denotes a curvature radius of the image side surface of the third lens;
    d5 denotes an on-axis thickness of the third lens; and
    TTL denotes a total optical length from an object side surface of the first lens to an image plane of the camera optical lens along an optic axis.

7. The camera optical lens as described in claim 6, further satisfying following conditions:

$-175.87 \leq f3/f \leq -15.22$;

$2.71 \leq (R5+R6)/(R5-R6) \leq 41.86$; and $0.05 \leq d5/TTL \leq 0.08$.

8. The camera optical lens as described in claim 1, wherein the object side surface of the fourth lens is convex in a paraxial region, the fourth lens further comprises an image side surface being concave in the paraxial region, and the camera optical lens satisfies following conditions:

$4.58 \leq f4/f \leq 131.90$;

$-147.87 \leq (R7+R8)/(R7-R8) \leq -4.00$; and $0.03 \leq d7/TTL \leq 0.09$, where
f denotes a focal length of the camera optical lens;
R8 denotes a curvature radius of the image side surface of the fourth lens; and
TTL denotes a total optical length from an object side surface of the first lens to an image plane of the camera optical lens along an optic axis.

9. The camera optical lens as described in claim 8, further satisfying following conditions:

$7.32 \leq f4/f \leq 105.52$;

$-92.42 \leq (R7+R8)/(R7-R8) \leq -5.00$; and $0.04 \leq d7/TTL \leq 0.07$.

10. The camera optical lens as described in claim 1, wherein the fifth lens comprises an object side surface being convex in a paraxial region and an image side surface being convex in the paraxial region, and the camera optical lens satisfies following conditions:
$0.45 \leq f5/f \leq 1.44$;
$0.33 \leq (R9+R10)/(R9-R10) \leq 1.19$; and
$0.08 \leq d9/TTL \leq 0.32$,
where
f denotes a focal length of the camera optical lens;
f5 denotes a focal length of the fifth lens;
R9 denotes a curvature radius of the object side surface of the fifth lens;
R10 denotes a curvature radius of the image side surface of the fifth lens;
d9 denotes an on-axis thickness of the fifth lens; and
TTL denotes a total optical length from an object side surface of the first lens to an image plane of the camera optical lens along an optic axis.

11. The camera optical lens as described in claim 10, further satisfying following conditions:

$0.73 \leq f5/f \leq 1.15$;

$0.53 \leq (R9+R10)/(R9-R10) \leq 0.95$; and $0.09 \leq d9/TTL \leq 0.25$.

12. The camera optical lens as described in claim 1, wherein the object side surface of the sixth lens is concave in a paraxial region, the sixth lens further comprises an image side surface being concave in the paraxial region, and the camera optical lens satisfies following conditions:

$-1.24 \leq f6/f \leq -0.39$;

$0.12 \leq (R11+R12)/(R11-R12) \leq 0.46$; and $0.05 \leq d11/TTL \leq 0.14$, where
f denotes a focal length of the camera optical lens;
f6 denotes a focal length of the sixth lens;
R12 denotes a curvature radius of the image side surface of the sixth lens;
d11 denotes an on-axis thickness of the sixth lens; and
TTL denotes a total optical length from an object side surface of the first lens to an image plane of the camera optical lens along an optic axis.

13. The camera optical lens as described in claim 12, further satisfying following conditions:

$-0.78 \leq f6/f \leq -0.49$;

$0.18 \leq (R11+R12)/(R11-R12) \leq 0.37$; and $0.07 \leq d11/TTL \leq 0.11$.

14. The camera optical lens as described in claim 1, wherein an F number FNO of the camera optical lens is smaller than or equal to 1.96.

15. The camera optical lens as described in claim 14, wherein the F number FNO of the camera optical lens is smaller than or equal to 1.92.

16. The camera optical lens as described in claim 1, wherein a total optical length TTL from an object side surface of the first lens to an image plane of the camera optical lens along an optic axis is smaller than or equal to 7.15 mm.

17. The camera optical lens as described in claim 16, wherein the total optical length TTL is smaller than or equal to 6.82 mm.

* * * * *